S. HAMM.
Suspender Buckles.
No. 143,144.            Patented September 23, 1873.
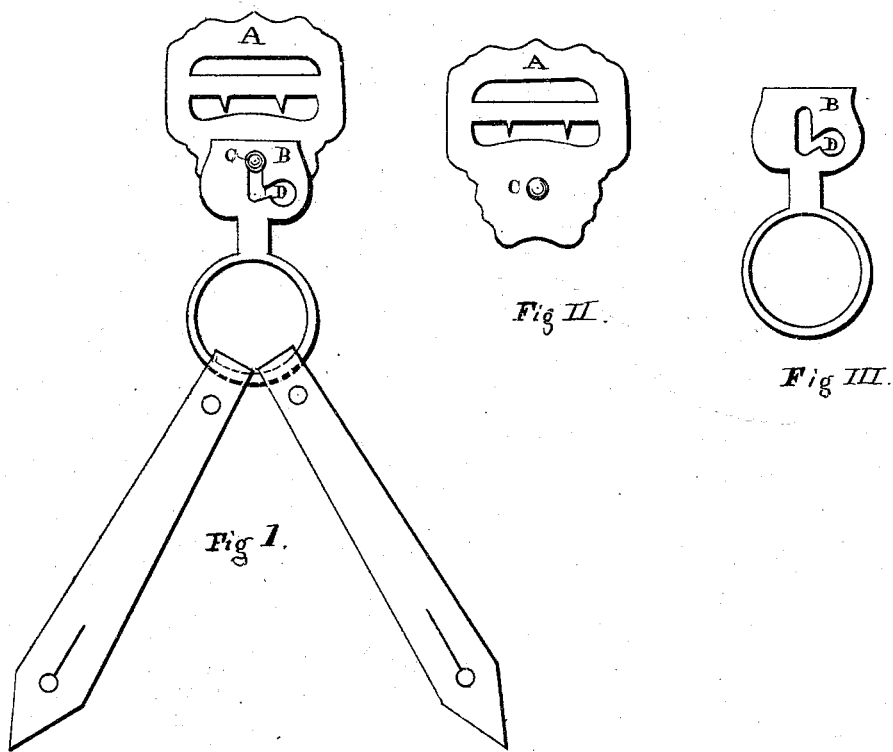

UNITED STATES PATENT OFFICE.

SAMUEL HAMM, OF PHILADELPHIA, PENNSYLVANIA.

IMPROVEMENT IN SUSPENDER-BUCKLES.

Specification forming part of Letters Patent No. 143,144, dated September 23, 1873; application filed June 26, 1873.

*To all whom it may concern:*

Be it known that I, SAMUEL HAMM, of the city and county of Philadelphia, in the State of Pennsylvania, have invented an Improvement in Suspender-Buckles, of which the following is a specification, reference being had to the accompanying drawings forming a part thereof, in which—

Figure 1 is a face view of the suspender-buckle complete. Fig. 2 is a face view of the under or pin plate. Fig. 3 is a face view of the slotted ring-plate.

This invention has relation to a suspender-buckle constructed in two parts or plates, one of which is constructed with an angular or L-shaped slot to receive a pin projecting from the face of the other, the object being to provide a self-adjusting buckle, whereby the suspender-straps may be readily attached to and detached from the suspenders, and when attached will be prevented from accidental detachment.

Referring to the drawings, A designates the adjustable under plate, provided with tongues or pins, and holding the stud C having an expanded head. B designates the plate, to which are attached the suspender-straps. This plate is constructed with an L-shaped or angular slot, D, having one end enlarged to admit the head of the stud C, which after being inserted moves to the other end of the slot, where it is held. The pin or stud is not liable to be displaced from the slot by the flexions of the body, or from similar accidental causes.

What I claim as new, and desire to secure by Letters Patent, is—

The combination of the buckle A, the pin C, and the attachment B having the slot D, substantially as and for the purpose hereinbefore set forth.

SAMUEL HAMM.

Witnesses:
EDWIN FIDELL,
JOHN ALEXANDER.